R. MILLS.
SHOVEL ATTACHMENT.
APPLICATION FILED JAN. 24, 1916.

1,232,361.

Patented July 3, 1917.

Witness
F. M. Roberds

Inventor,
R. Mills

By David P. Moore
Attorney

UNITED STATES PATENT OFFICE.

ROBERT MILLS, OF PUEBLO, COLORADO, ASSIGNOR OF ONE-HALF TO COM. . LOGSTON, OF PUEBLO, COLORADO.

SHOVEL ATTACHMENT.

1,232,361.  Specification of Letters Patent.  Patented July 3, 1917.

Application filed January 24, 1916. Serial No. 74,055.

*To all whom it may concern:*

Be it known that I, ROBERT MILLS, a citizen of the United States, residing at Pueblo, in the county of Pueblo and State of Colorado, have invented certain new and useful Improvements in Shovel-Attachments, of which the following is a specification.

The invention relates to a shovel, and more particularly to the class of convertible shovels.

The primary object of the invention is the provision of a shovel of this character, wherein the blade thereof is constructed with bearings receiving an axle supporting wheels, so that the shovel can be readily and conveniently converted into a truck, thereby making the implement handy for use either as a shovel or truck.

Another object of the invention is the provision of a shovel of this character, which is novel in form, so as to make the same handy for use in hauling sacks of material, produce, grain or the like.

A further object of the invention is the provision of a shovel of this character, which is simple in construction, reliable and efficient in its purposes, strong, durable, and inexpensive in manufacture.

With these and other objects in view, the invention consists in the features of construction, combination and arrangement of parts as will be hereinafter fully described, illustrated in the accompanying drawing, and pointed out in the claim hereunto appended.

In the accompanying drawing.

Similar reference characters indicate corresponding parts throughout the several views in the drawing.

Figure 1:
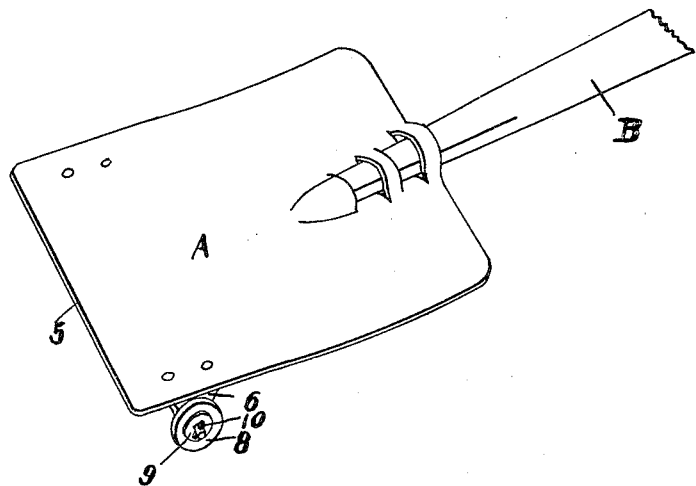
Figure 1, is a perspective view of a shovel constructed in accordance with the invention.
Figure 2:
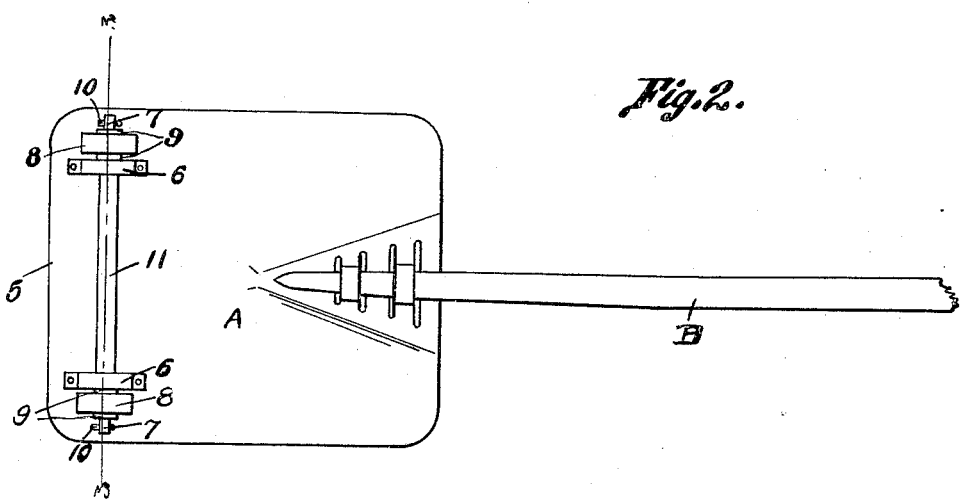
Fig. 2, is a bottom plan view.
Figure 3:
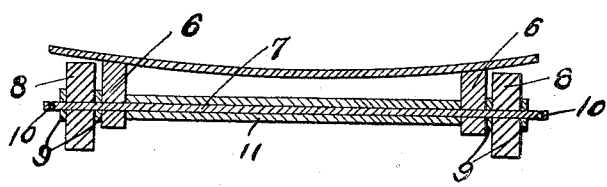
Fig. 3, is a sectional view on the line 3—3 of Fig. 2.

Referring to the drawing, in detail, A, designates the blade, and B, the handle of the shovel, which latter is secured to the blade in any suitable manner, the blade being of the spade type.

Secured to the under face of the blade A, near the front cutting edge 5, thereof are spaced bearings 6, which are riveted thereto in any ordinary well known manner, and journaled in these bearings 6, is an axle 7, which carries at its outer ends rollers 8, while arranged on opposite sides of the latter are washers 9, the inner ones of which play against the bearings at their outer sides, and the outer washers play against cotter pins 10 securing the rollers on the axle.

Arranged between the bearings 6, and surrounding the axle 7, is a sleeve 11, which serves to reinforce the bearings against end thrust, and also strengthens the said axle.

As before stated, the shovel of this invention is adapted for use in hauling sacks of material, and like small relatively heavy articles. In order to admit of the easy manipulation of the shovel for this purpose the bearings 6 are located beneath the forward end of the shovel and inwardly of the lateral and end edges thereof so as to be out of the way, and so as to permit considerable leverage of the blade without injury to the same when lifting or carrying the heavy sacks of material. In other words, the sack may be slightly tilted by engaging the outer edge of the blade beneath the sack and swinging the shovel handle down as a lever, and the shovel may be continuously worked in such manner until sufficient of the sack is placed on the blade to support the sack.

Prior attempts have been made in this art to support shovels on rollers for carrying loads. Practically, they have fallen short of their purpose either by virtue of their impractical construction which precludes the application of the rollers to the sheet metal shovel blades which are now commonly used, and which are economical in manufacture, and also by virtue of the position of the rollers beneath the blade in such a manner that the blade is subjected to considerable strain and is thereby cracked or broken, and requires too great a pressure upon the handle to be transmitted through any practical connection between the handle and the blade.

From the foregoing it is thought that the construction and manner of use of the shovel will be clearly understood, and therefore a more extended explanation has been omitted.

What is claimed is:

In combination with a shovel blade, a pair of transversely spaced bearings secured against the lower side of said blade at its forward end and spaced inwardly from the lateral and end edges of the blade, an axle mounted to turn in said bearings and projecting beyond the outer sides of the same, a sleeve mounted on the axle and engaging the bearings at its opposite ends to reinforce the bearings against lateral pressure, and rollers mounted to turn on the outer ends of the axle and in proximity to the outer sides of said bearings.

In testimony whereof I affix my signature.

ROBERT MILLS.